Figure 1:
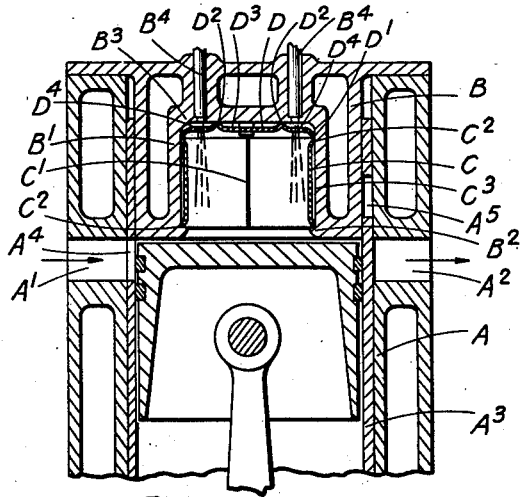

Sept. 12, 1933.　　　　H. R. RICARDO　　　　1,926,499
INTERNAL COMBUSTION ENGINE OF THE LIQUID FUEL
INJECTION COMPRESSION IGNITION TYPE
Filed May 18, 1931

INVENTOR
Harry R. Ricardo

Patented Sept. 12, 1933

1,926,499

UNITED STATES PATENT OFFICE 1,926,499

INTERNAL COMBUSTION ENGINE OF THE LIQUID FUEL INJECTION COMPRESSION IGNITION TYPE

Harry Ralph Ricardo, London, England

Application May 18, 1931, Serial No. 538,290, and in Great Britain June 25, 1930

21 Claims. (Cl. 123—32)

This invention relates to internal combustion engines of the liquid fuel injection compression ignition type, in which the combustion chamber is of circular cross-section in a plane at right angles to the cylinder axis and of smaller mean diameter than the cylinder bore, and more particularly to engines of this kind in which the air charge is caused to be in a state of rotation about the axis of this combustion chamber at the end of the compression stroke, the fuel being injected during normal running by one or more fuel injection devices each disposed at a substantial distance from the axis of the combustion chamber and delivering a jet or jets of fuel the mean direction of each of which is either parallel to or has a substantial component in a direction parallel to the combustion chamber axis.

In engines of this kind, examples of which are described in the specifications of the present applicant's prior Letters Patent of the United States of America No. 1,622,885 dated 29th March 1927 and No. 1,705,374 dated 12th May 1929, and in the specifications of the present applicant's application for Letters Patent of the United States of America Serial No. 293,982 filed 19th July 1928; Serial No. 451,730 filed 12th May 1930; or No. 483,335 filed 20th September 1930, the circumferential portions of the air charge move at high velocity relatively to the combustion chamber walls, and in previously proposed constructions this gives rise to an undesirably high transference of heat from these portions of the charge to the combustion chamber walls with the result that the circumferential portions of the charge become chilled and, since it is difficult to prevent a part of the fuel entering this chilled circumferential region, incomplete combustion in this region tends to result together with rough running due to delayed ignition and carbonization.

The object of the present invention is to provide an arrangement in which improved combustion will be effected. To this end in an engine of the general type referred to according to the present invention a metallic lining is provided for the whole or a substantial part of the combustion chamber, this lining being constructed and arranged so as to prevent the free flow of heat from the gases in the combustion chamber to and through the walls of that chamber and thus prevent or reduce the chilling effect of the combustion chamber walls on the circumferential portions of the rotating air charge.

Thus the liner is conveniently separated from the combustion chamber wall by an air gap or a layer of heat-insulating material.

When the invention is applied to an engine of the kind in which the combustion chamber opens at one end into a cylinder and is closed at its other end, for example as described in the specification of the present applicant's prior Letters Patent of the United States of America No. 1,622,885 dated 29th March 1927, the liner may comprise an annular part which screens an annular portion or the whole of the circumferential wall of the combustion chamber, or may have in addition a part formed integral with or separate from the annular portion and shielding the closed end wall of the combustion chamber remote from the cylinder bore. When, on the other hand, the invention is applied to an engine of the type in question comprising two coaxial cylinders arranged end to end with a combustion chamber between their adjacent ends of smaller mean diameter than the cylinder bores, as described for example in the specification of the present applicant's copending application for Letters Patent of the United States of America Serial No. 451,730 filed 12th May 1930, the liner is arranged to lie adjacent to an annular portion or the whole of the circumferential wall of the combustion chamber.

The manner in which the liner is inserted into and held in place in the combustion chamber may vary but preferably an inwardly extending flange is provided in the mouth of the combustion chamber where it opens into the cylinder or at each end of the combustion chamber in constructions in which the combustion chamber lies between the adjacent ends of two coaxial cylinders, and the circumferential wall of the liner is split longitudinally or helically so that the liner can be sprung into position behind the flange or between the flanges which will then retain it in place.

Alternatively, instead of the liner being sprung into place and then held in position by one or more flanges, this liner may be unsplit and may be held in place after insertion into the combustion chamber by a circlip sprung into a circumferential groove in the mouth of the combustion chamber or into a circumferential groove in each end of the combustion chamber where it lies between two coaxial cylinders.

In either case where one end only of the combustion chamber communicates with a cylinder, the other end being closed by an end wall which is also shielded by an end portion of the liner, this end portion of the liner may be either formed separately from or integral with the annular part of the liner which shields the circumferential wall of the combustion chamber and may be held in position by this annular part, the end portion of the liner being provided with one or more projections which bear against the end wall of the combustion chamber so as to limit and determine the dimensions of the air space between the end wall of the combustion chamber and the end portion of the liner.

The manner in which the circumferential wall of the liner is maintained concentric with the combustion chamber with the correct air gap between these members may vary but in a convenient construction the circumferential wall of the liner is provided at its ends with outwardly extending flanges which bear against the circumferential wall of the combustion chamber so as to locate the liner correctly and determine the size of the air gap between the combustion chamber and liner walls.

Figure 3:
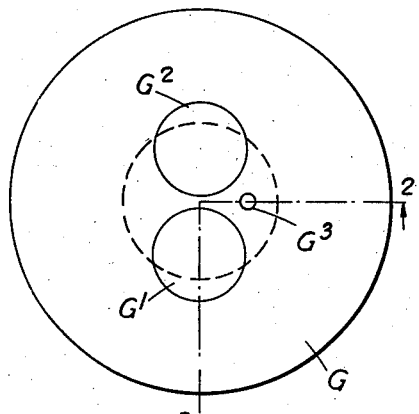
Figure 2:
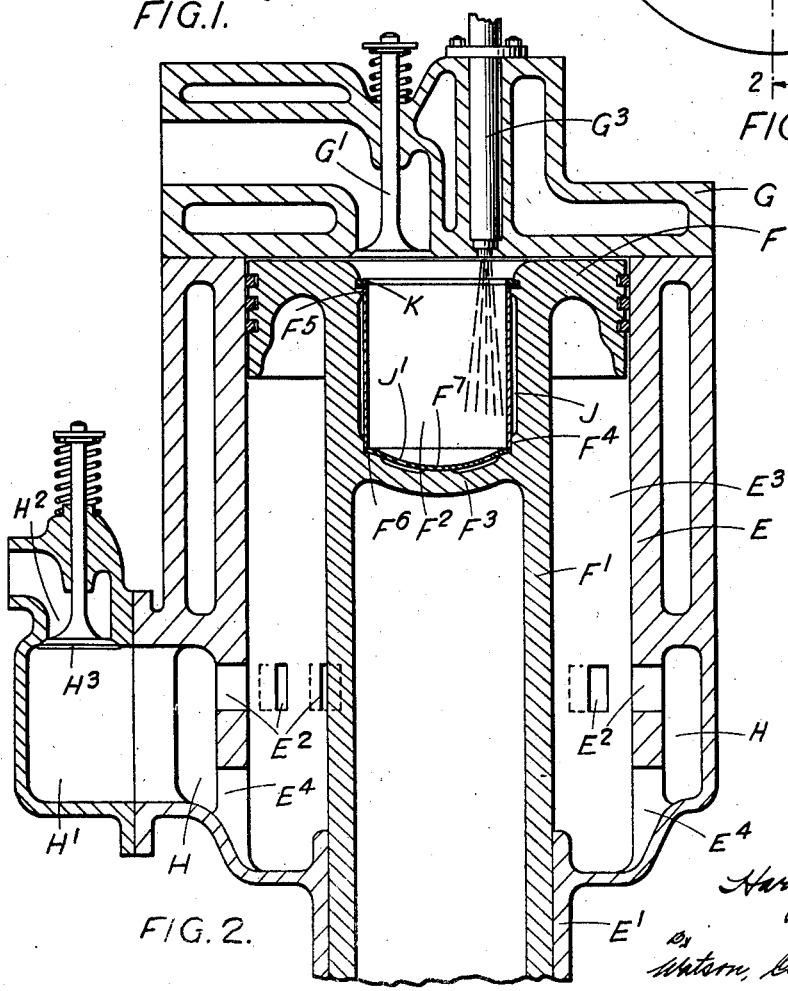

As stated the invention is particularly applicable to engines of the type in question as described in the specifications of the present applicant's prior Letters Patent of the United States of America No. 1,622,885 dated 29th March 1927 and No. 1,705,374 dated 12th May 1929, and in the specification of the present applicant's prior application for Letters Patent of the United States of America Serial No. 293,982 filed 19th July 1928, and two alternative constructions according to this invention applicable to such engines are illustrated by way of example in the accompanying drawing, in which Figure 1 is a sectional side elevation of the upper part of a cylinder, cylinder head and combustion chamber of an engine to which the present invention is applied, Figure 2 is a similar view to Figure 1 of an alternative construction in which the combustion chamber is formed in the piston, and Figure 3 is a plan of the construction shown in Figure 2.

In the construction illustrated in Figure 1 the engine comprises a cylinder A closed at its upper end by a cylinder head B and provided with an inlet port $A^1$ and an exhaust port $A^2$ controlled by a sleeve valve $A^3$ the upper end of which lies and can move in an annular space left between the outer circumferential wall of the cylinder head and the inner wall of the cylinder. The sleeve valve $A^3$ has an inlet port $A^4$ and an exhaust port $A^5$ and is adapted to have a combined oscillating and reciprocating motion imparted to it in known manner so that the charge enters the cylinder through the ports $A^1$ and $A^4$ in such a manner as to cause the whole charge in the cylinder to be in a state of rotation about the axis of the cylinder at the end of the induction stroke and during the whole compression stroke.

Formed in the cylinder head B is a substantially cylindrical combustion chamber $B^1$ disposed coaxially with the cylinder A and of smaller diameter than the cylinder bore, the diameter of the combustion chamber being, for example, as shown approximately half that of the cylinder bore. Formed around the mouth of the combustion chamber is a shallow inwardly extending flange $B^2$ which serves to maintain in place within the combustion chamber a cylindrical metal liner C. This liner is split longitudinally as shown at $C^1$ so as to permit its insertion into the combustion chamber behind the flange, the liner thus being sprung into place. The upper and lower edges of the cylindrical liner C are formed with shallow outwardly extending flanges $C^2$ which bear against the combustion chamber wall when the liner is in position and thus locate the liner within the combustion chamber and provide an air gap $C^3$ between the outer circumferential wall of the liner and the inner circumferential wall of the combustion chamber. The upper closed end $B^3$ of the combustion chamber is also shielded by a lining wall in the form of a disc-like member D which is slightly dished as shown and has a rib $D^1$ along its circumferential edge which lies in contact with the upper end of the cylindrical liner C and with the circumferential wall of the combustion chamber. The disc-like member D is also provided with projections $D^2$ on its upper face bearing against the end wall $B^3$ of the combustion chamber so as to provide an air space $D^3$ between the disc-like member D and the end wall $B^3$ of the combustion chamber.

The dimensions of the air gaps $C^3$ and $D^3$ between the wall of the liner C and the member D and the adjacent walls of the combustion chamber $B^1$ may vary, but in a combustion chamber approximately four inches in diameter the width of this air gap may be of the nature of 0.03 inch. The liner may be formed of various metals but is preferably formed of heat-resisting steel.

Formed in the upper end wall of the combustion chamber at a substantial distance from the combustion chamber axis are one or more openings $B^4$ for fuel sprayers, these fuel sprayers being adapted to deliver a jet or jets of fuel the mean direction of each of which is substantially parallel to or has a substantial component in a direction parallel to the combustion chamber axis, suitable ports $D^4$ being provided in the member D to accommodate these sprayers and admit the free passage of the jet or jets into the combustion chamber.

In the alternative construction illustrated in Figures 2 and 3 the invention is shown as applied to a piston operating in a cylinder E and comprising a head portion F acting as a piston only and a portion $F^1$ of smaller diameter adapted to reciprocate in a separate cylinder $E^1$ and act as a cross head. The upper end of the cylinder E is closed by a cylinder head G in which are formed inlet and exhaust ports controlled by valves $G^1$, $G^2$ and also a fuel injection device $G^3$.

Formed in the cylinder E adjacent to its lower end is a series of subsidiary inlet ports $E^2$ arranged substantially tangentially with respect to the cylinder and leading out of an annular chamber H which is in communication with a pocket $H^1$ having an air inlet port $H^2$ controlled by an automatic inlet valve $H^3$, the annular chamber H also communicating with the space $E^3$ below the piston head F through ports $E^4$. Thus, as the piston F moves upwards on the exhaust stroke, air is drawn in through the valve $H^3$, the chamber H and the ports $E^2$ into the annular space below the piston head while, during the following induction stroke, this air is compressed into the chamber H and towards the end of the induction stroke the piston head F uncovers the ports $E^2$ so that this air enters the cylinder through these ports in a tangential direction and thus causes rotation of the whole air charge in the cylinder, this rotation being maintained during the following compression stroke.

A combustion chamber $F^2$ is formed as a cylindrical recess in the face of the piston F, $F^1$, this face being adapted to approach closely the cylinder head at the end of the compression stroke, the fuel injection device $G^3$ being disposed a substantial distance from the axis of the combustion chamber $F^2$ and being adapted to deliver a jet of fuel which is either parallel to or has a substantial component in a direction parallel to the combustion chamber axis. The combustion chamber is, as shown, of substantially cylindrical form and has a somewhat domed end wall F³.

Disposed within the combustion chamber F² is a metallic liner, preferably formed of heat-resisting material and comprising a cylindrical wall J shielding the circumferential wall of the combustion chamber and spaced therefrom and held concentrically therewith by shallow internal flanges F⁴, F⁵ at the ends of the combustion chamber, within which flanges lie the end portions of the cylindrical wall J of the liner. The end wall F³ of the combustion chamber is shielded by a corresponding end portion J¹ of the liner which is domed to conform to the shape of the end wall of the combustion chamber and is spaced from this end wall by an annular seating F⁶ on which rests the circumferential edge of the member J¹ and by a shallow projection F⁷ in the domed end wall of the combustion chamber on which bears the centre of the member J¹.

The whole liner is retained in place by a split spring clip or ring K which is sprung into place in a circumferential groove in the mouth of the combustion chamber, the face of the ring lying opposite to that which engages the liner and a corresponding face of the groove being inclined so that as the spring ring K expands into the groove it moves slightly axially towards the liner J so as to hold this liner rigidly in place.

It is to be understood that the arrangements described above are given by way of example only and that details of construction may be varied, and that the invention may be applied to engines of the type in question having various forms of combustion chamber without departing from this invention.

What I claim as my invention and desire to secure by Letters Patent is:—

1. An internal combustion engine of the liquid fuel injection compression ignition type including in combination a cylinder, a piston, a cylinder head, a combustion chamber which is substantially straight-sided in cross-section opening into the cylinder bore and having a mean diameter which is less than that of the cylinder bore, an internal flange extending around the mouth of the combustion chamber, a metallic lining for the circumferential wall of the combustion chamber, the major portion of such lining being heat-insulated from the combustion chamber wall and being split longitudinally so that it can be sprung into position behind the internal flange and will then be retained in position by such flange, means whereby the gaseous charge is caused to be in a state of rotation about the combustion chamber axis at the end of the compression stroke, and at least one fuel injection device disposed at a substantial distance from the combustion chamber axis and delivering at least one jet of fuel the mean direction of which is either parallel to or has a substantial component in a direction parallel to the combustion chamber axis.

2. An internal combustion engine of the liquid fuel injection compression ignition type including in combination a cylinder, a piston, a cylinder head, a combustion chamber which is substantially straight-sided in cross-section opening into the cylinder bore and having a mean diameter which is less than that of the cylinder bore, an internal flange extending around the mouth of the combustion chamber, and a metallic lining for the circumferential wall of the combustion chamber, the major portion of such lining being heat-insulated from the combustion chamber wall and being split longitudinally so that it can be sprung into position behind the internal flange and will then be retained in position by such flange.

3. An internal combustion engine of the liquid fuel injection compression ignition type including in combination a cylinder, a piston, a cylinder head, a combustion chamber opening into the cylinder and having a mean dieamter which is less than that of the cylinder bore, a circumferential groove being formed around the mouth of the combustion chamber, a metallic lining for the circumferential wall of the combustion chamber, the major portion of such lining being heat-insulated from the combustion chamber wall, a split ring lying within the groove and serving to retain the metallic lining in position, means whereby the gaseous charge is caused to be in a state of rotation about the combustion chamber axis at the end of the compression stroke, and at least one fuel injection device disposed at a substantial distance from the combustion chamber axis and delivering at least one jet of fuel the mean direction of which is either parallel to or has a substantial component in a direction parallel to the combustion chamber axis.

4. An internal combustion engine of the liquid fuel injection compression ignition type including in combination a cylinder, a piston, a cylinder head, a combustion chamber opening into the cylinder and having a mean diameter which is less than that of the cylinder bore, a circumferential groove being formed around the mouth of the combustion chamber, a metallic lining for the circumferential wall of the combustion chamber, the major portion of such lining being heat-insulated from the combustion chamber wall, and a split ring lying within the groove and serving to retain the metallic lining in position.

5. An internal combustion engine of the liquid fuel injection compression ignition type including in combination a cylinder, a piston, a cylinder head, a combustion chamber opening into the cylinder and having a mean diameter which is less than that of the cylinder bore, a circumferential groove being formed around the mouth of the combustion chamber, a metallic lining for the circumerential wall of the combustion chamber, the major portion of such lining being heat-insulated from the combustion chamber wall, a split ring lying within the groove and serving to retain the metallic lining in position, the surface of the ring remote from the metallic lining being inclined so that as the ring expands into the groove it is moved longitudinally to bear on the end of the lining, means whereby the gaseous charge is caused to be in a state of rotation about the combustion chamber axis at the end of the compression stroke, and at least one fuel injection device disposed at a substantial distance from the combustion chamber axis and delivering at least one jet of fuel the mean direction of which is either parallel to or has a substantial component in a direction parallel to the combustion chamber axis.

6. An internal combustion engine of the liquid fuel injection compression ignition type including in combination a cylinder, a piston, a cylinder head, a combustion chamber opening into the cylinder and having a mean diameter which is less than that of the cylinder bore, a circumferential groove being formed around the mouth of the combustion chamber, a metallic lining for the circumferential wall of the combustion chamber, the major portion of such lining being heat-insulated from the combustion chamber wall, and a split ring lying within the groove and serving to retain the metallic lining in position, the surface of the ring remote from the metallic lining being inclined so that as the ring expands into the groove it is moved longitudinally to bear on the end of the lining.

7. An internal combustion engine of the liquid fuel injection compression ignition type including in combination a cylinder, a piston, a cylinder head, a combustion chamber which is straight-sided in cross-section opening into the cylinder and having a mean diameter which is less than that of the cylinder bore, an internal flange extending around the combustion chamber mouth, a metallic lining for the circumferential wall of the combustion chamber, such lining being split longitudinally so that it can be sprung into position behind the internal flange and will then be retained in position by such flange, and external circumferential ribs on the ends of the lining serving to space the major part of the lining from the combustion chamber wall.

8. An internal combustion engine of the liquid fuel injection compression ignition type including in combination a cylinder, a piston, a cylinder head, a combustion chamber which is straight-sided in cross-section opening into the cylinder and having a mean diameter which is less than that of the cylinder bore, an internal flange extending around the combustion chamber mouth, a metallic lining for the circumferential wall of the combustion chamber, such lining being split longitudinally so that it can be sprung into position behind the internal flange and will then be retained in position by such flange, external circumferential ribs on the ends of the lining serving to space the major part of the lining from the combustion chamber wall, means whereby the gaseous charge is caused to be in a state of rotation about the combustion chamber axis at the end of the compression stroke, and at least one fuel injection device disposed at a substantial distance from the axis of the combustion chamber and delivering at least one jet of fuel the mean direction of which is either parallel to or has a substantial component in a direction parallel to the combustion chamber axis.

9. An internal combustion engine of the liquid fuel injection compression ignition type including in combination a cylinder, a piston, a cylinder head, a combustion chamber which is substantially straight-sided in cross-section opening at one end into the cylinder bore and closed at its other end and having a mean diameter which is less than that of the cylinder bore, an internal flange extending around the mouth of the combustion chamber, a metallic lining comprising a part lying adjacent to but having the major portion thereof heat-insulated from the circumferential wall of the combustion chamber and a part lying adjacent to but having the major portion thereof heat-insulated from the end wall of the combustion chamber, the part lying adjacent to the circumferential wall of the combustion chamber being split longitudinally so that it can be sprung into position behind the internal flange and will then be retained in position by such flange, means whereby the gaseous charge is caused to be in a state of rotation about the combustion chamber axis at the end of the compression stroke, and at least one fuel injection device disposed at a substantial distance from the combustion chamber axis and delivering at least one jet of fuel the mean direction of which is either parallel to or has a substantial component in a direction parallel to the combustion chamber axis.

10. An internal combustion engine of the liquid fuel injection compression ignition type including in combination a cylinder, a piston, a cylinder head, a combustion chamber which is substantially straight-sided in cross-section opening at one end into the cylinder bore and closed at its other end and having a mean diameter which is less than that of the cylinder bore, an internal flange extending around the mouth of the combustion chamber, and a metallic lining comprising a part lying adjacent to but having the major portion thereof heat-insulated from the circumferential wall of the combustion chamber and a part lying adjacent to but having the major portion thereof heat-insulated from the end wall of the combustion chamber, the part lying adjacent to the circumferential wall of the combustion chamber being split longitudinally so that it can be sprung into position behind the internal flange and will then be retained in position by such flange.

11. An internal combustion engine of the liquid fuel injection compression ignition type including in combination a cylinder, a piston, a cylinder head, a combustion chamber opening at one end into the cylinder bore and closed at its other end and having a mean diameter which is less than that of the cylinder bore, a circumferential groove being formed around the mouth of the combustion chamber, a metallic lining comprising a part which lies adjacent to but which has the major portion thereof heat-insulated from the circumferential wall of the combustion chamber and a part which lies adjacent to but which has the major portion thereof heat-insulated from the end wall of the combustion chamber, a split ring lying within the groove and serving to retain the metallic lining in position, means whereby the gaseous charge is caused to be in a state of rotation about the combustion chamber axis at the end of the compression stroke, and at least one fuel injection device disposed at a substantial distance from the combustion chamber axis and delivering at least one jet of fuel the mean direction of which is either parallel to or has a substantial component in a direction parallel to the combustion chamber axis.

12. An internal combustion engine of the liquid fuel injection compression ignition type including in combination a cylinder, a piston, a cylinder head, a combustion chamber opening at one end into the cylinder bore and closed at its other end and having a mean diameter which is less than that of the cylinder bore, a circumferential groove being formed around the mouth of the combustion chamber, a metallic lining comprising a part which lies adjacent to but which has the major portion thereof heat-insulated from the circumferential wall of the combustion chamber and a part which lies adjacent to but which has the major portion thereof heat-insulated from the end wall of the combustion chamber, and a split ring lying within the groove and serving to retain the metallic lining in position.

13. An internal combustion engine of the liquid fuel injection compression ignition type including in combination a cylinder, a piston, a cylinder head, a combustion chamber which is straight-sided in cross-section opening at one end into the cylinder bore and closed at its other end and having a mean diameter which is less than that of the cylinder bore, an internal flange formed around the mouth of the combustion chamber, and a metallic lining comprising a part lying adjacent to the end wall of the combustion chamber and a part which lies adjacent to the circumferential wall of the combustion chamber and is split longitudinally so that when sprung into position behind the internal flange it will be retained in position by such flange, and external circumferential ribs on the parts of the lining serving to maintain the major portions of such lining out of contact with the combustion chamber walls.

14. An internal combustion engine of the liquid fuel injection compression ignition type including in combination a cylinder, a piston, a combustion chamber which is substantially straight-sided in cross-section opening into the cylinder bore and having a mean diameter which is less than that of the cylinder bore, an internal flange extending around the mouth of the combustion chamber, and a metallic lining for the circumferential wall of the combustion chamber, the major portion of such lining being heat-insulated from the combustion chamber wall and being split longitudinally so that it can be sprung into position behind the internal flange and will then be retained in position by such flange.

15. An internal combustion engine of the liquid fuel injection compression ignition type including in combination a cylinder, a piston, a combustion chamber opening into the cylinder and having a mean diameter which is less than that of the cylinder bore, a circumferential groove being formed around the mouth of the combustion chamber, a metallic lining for the circumferential wall of the combustion chamber, the major portion of such lining being heat-insulated from the combustion chamber wall, and a split ring lying within the groove and serving to retain the metallic lining in position.

16. In an internal combustion engine, the combination with a cylinder, of a piston within said cylinder, a combustion chamber communicating with said cylinder, a liner seated within said combustion chamber and having the major portion thereof spaced from the combustion chamber walls, and means whereby said liner may be yieldingly retained against displacement outwardly of the chamber to permit relative expansion of the chamber and liner.

17. In an internal combustion engine, the combination with a cylinder, of a piston within said cylinder, a combustion chamber communicating with said cylinder, a liner seated within said combustion chamber and having the major portion thereof spaced from the combustion chamber walls, and means whereby said liner may be yieldingly retained against displacement outwardly of the chamber to permit relative expansion of the chamber and liner, said means including a resilient retaining member positioned within the combustion chamber and engaging the outer end of the liner.

18. An internal combustion engine of the liquid fuel injection compression ignition type including in combination a cylinder, a piston, a cylinder head, a combustion chamber opening at one end into the cylinder and closed at its other end and having a mean diameter which is less than that of the cylinder, a metallic liner capable of insertion into and withdrawal from the combustion chamber through its mouth and resiliently supported within said combustion chamber, said liner comprising a part lying adjacent to the circumferential wall of the combustion chamber and a part lying adjacent to the end wall of the combustion chamber, means for maintaining the major portions of the liner out of contact with the combustion chamber wall, means whereby the gaseous charge is caused to be in a state of rotation about the combustion chamber axis at the end of the compression stroke, and at least one fuel injection device disposed at a substantial distance from the axis of the combustion chamber and delivering at least one jet of fuel, the mean direction of which is either parallel to or has a substantial component in a direction parallel to the combustion chamber axis.

19. An internal combustion engine of the liquid fuel injection compression ignition type including in combination a cylinder, a piston, a cylinder head, a combustion chamber opening into the cylinder and having a mean diameter which is less than that of the cylinder, a liner the major portion of which is heat-insulated from the combustion chamber wall and is capable of insertion into and withdrawal from the combustion chamber through its mouth, an annular part seating in the combustion chamber and formed separately from the liner, this part engaging the outer end of the liner when in position within the combustion chamber and serving to resiliently retain the liner in position within the combustion chamber, means whereby the gaseous charge is caused to be in a state of rotation about the combustion chamber axis at the end of the compression stroke, and at least one fuel injection device disposed at a substantial distance from the axis of the combustion chamber and delivering at least one jet of fuel, the mean direction of which is either parallel to or has a substantial component in a direction parallel to the combustion chamber axis.

20. An internal combustion engine of the liquid fuel injection compression ignition type including in combination a cylinder, a piston, a cylinder head, a combustion chamber which is straight-sided in cross-section opening into the cylinder and having a mean diameter which is less than that of the cylinder, a metallic liner for the circumferential wall of the combustion chamber which can be inserted into and withdrawn through the mouth of the combustion chamber, external circumferential ribs formed on the ends of the liner so as to space the main part of the liner from the combustion chamber wall, and a member seated in the combustion chamber and formed separately from the liner, this part engaging one end of the liner when in position within the combustion chamber and serving by reason of the resilience of one of these engaging parts to yieldingly retain the liner against displacement within the combustion chamber.

21. In an internal combustion engine, the combination with a cylinder, of a piston within said cylinder, a combustion chamber communicating with said cylinder, and a resilient split liner within said combustion chamber having portions thereof engaging the combustion chamber walls and exerting yielding pressure against the same, the major portion of said liner being heat-insulated from the combustion chamber walls.

HARRY RALPH RICARDO.